June 2, 1964  C. G. PARISI ETAL  3,135,614
FOOD PACKAGE
Filed Sept. 22, 1961  2 Sheets-Sheet 1
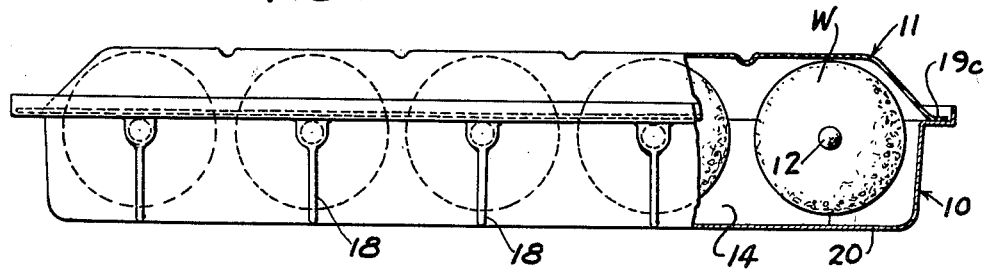
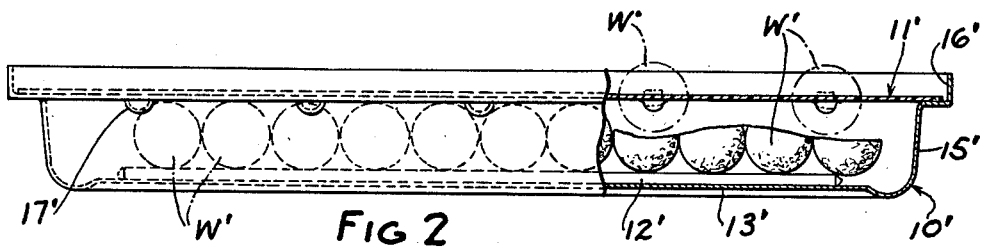
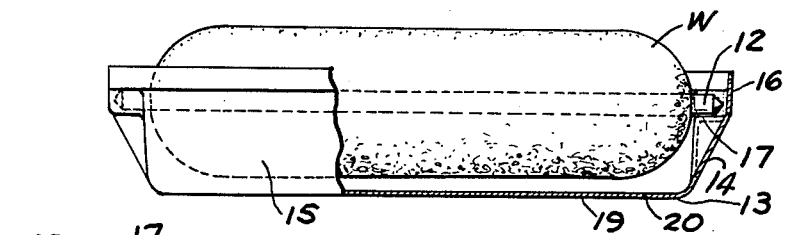
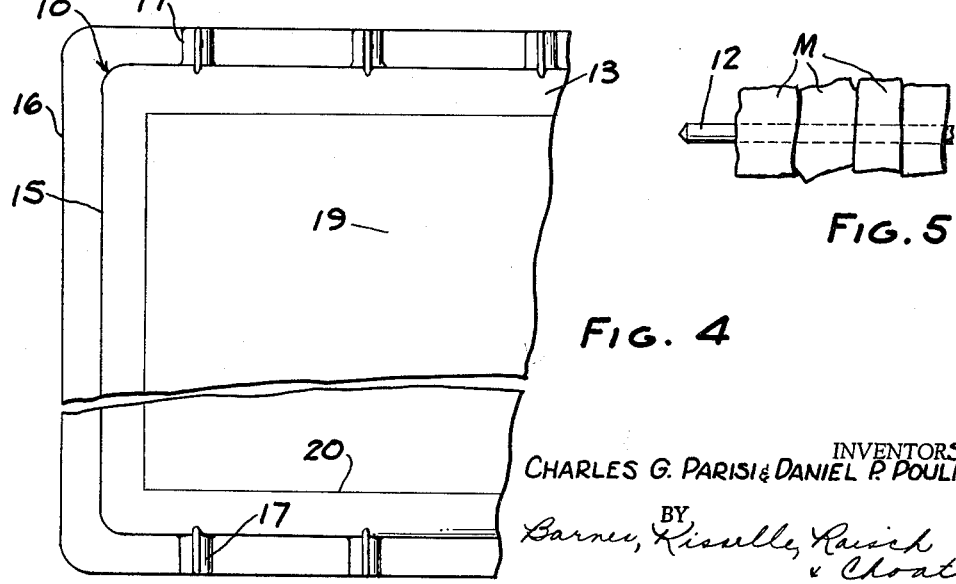
INVENTORS
CHARLES G. PARISI & DANIEL P. POULIOS
BY
ATTORNEYS June 2, 1964  C. G. PARISI ETAL  3,135,614
FOOD PACKAGE
Filed Sept. 22, 1961  2 Sheets-Sheet 2

INVENTORS
CHARLES G. PARISI & DANIEL P. POULIOS
BY
Barnes, Kisselle, Raisch & Choate
ATTORNEYS 3,135,614
FOOD PACKAGE
Charles G. Parisi, Harper Woods, and Daniel P. Poulios, Detroit, Mich., assignors, by mesne assignments, to Charles G. Parisi, Harper Woods, James Parisi, Grosse Pointe Woods, and Richard Thompson, Detroit, Mich.
Filed Sept. 22, 1961, Ser. No. 139,974
9 Claims. (Cl. 99—192)

This invention relates to food packages and particularly to food packages which can be used also as a container for cooking the food.

It is an object of this invention to provide a frozen food package which contains the elements necessary for cooking the food by broiling.

It is a further object of the invention to provide a frozen food package wherein a plurality of skewers, on which frozen food is placed, are supported in a package in condition so that frozen food on the skewers is ready for subjection to heating upon removal of the cover of the package.

It is a further object of the invention to provide such a package wherein provision is made for placing the package over an open fire such as a charcoal fire for broiling the food on the skewers.

It is a further object of the invention to provide a novel food package constituting a tray in which a plurality of skewers having food supported thereon are positioned in proper relation for broiling.

It is a further object of the invention to provide a novel tray and skewer arrangement for supporting food for broiling either in an oven or over an open flame, such as a charcoal fire.

Basically, the food package comprises a tray having opposed walls with longitudinally spaced vertical seats or slots therein for retaining the ends of skewers. The food product, such as meat, preferably frozen, is placed on the skewers before freezing. The slots are so positioned that the food is in spaced relation to the base of the tray. A cvoer is provided over the tray. When it is desired to cook the food, the cover is removed and the tray is inserted in the oven or the like. As the food is being cooked, the support of the skewers permits the skewers to be rotated as by a fork to expose different areas of the food to the flame. The tray is preferably made of metal foil and a portion of the base of the tray is weakened so that it can be removed to provide an opening so that the tray with the food on the skewers can be positioned over an open flame or other heat source for broiling the food. In an alternative form, the retaining slots are provided by a wire rack that is positioned over the upper edge of the peripheral flange of a conventional pan. In a further form of the invention, a second deep tray is provided into which the first tray is telescoped and charcoal or other combustible material is positioned between the first and second trays so that there is thereby provided a unitary broiling package. In this form tray the bottom of the first tray is weakened or provided with openings.

In the drawings:

FIG. 1 is a side elevation of the frozen food package embodying the invention.

FIG. 2 is a part sectional elevation similar to FIG. 1 showing a modified form of the invention.

FIG. 3 is a part sectional end view of the package shown in FIG. 1.

FIG. 4 is a fragmentary plan view of the tray used in the package used in FIGS. 1 and 3.

FIG. 5 is a fragmentary side elevation of a skewer holding a different food product.

Figure 6:
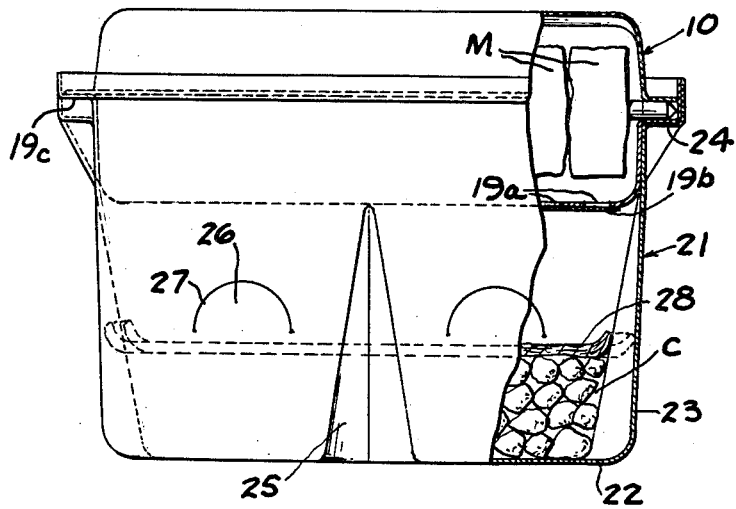
FIG. 6 is a part sectional end view of a modified form of package.

Referring to FIGS. 1 and 2, the frozen food package shown therein comprises a tray 10, cover 11 and a plurality of skewers 12 having frozen food thereon such as wieners W.

Tray 10 is made of a heat resistant material and preferably comprises a thin metal foil. Tray 10 includes a base 13 and a peripheral flange extending upwardly from the base and defining opposed side walls 14 and opposed end walls 15. In addition, tray 10 includes an L-shaped peripheral lip 16 extending completely around the side walls 14 and end walls 15.

Walls 14 are provided with longitudinally spaced retaining slots 17 in the upper end thereof. The slots 17 extend vertically and have the upper ends thereof open so that the end of a skewer can be inserted downwardly into the slot as shown in FIG. 3. Opposed slots in the opposed walls 14 are aligned so that each skewer with the food thereon is supported as shown in FIG. 3. The height of the walls 14 is such with relation to the diameter of the food product W that the food is maintained in spaced relationship to the base 13 of the tray.

Cover 11 is preferably made of plastic material and includes a peripheral bead 19C that is adapted to snap within the lip 16 of the tray. The central portion of the cover 11 is elevated so that it just clears the food product on the skewers.

Reinforcing ribs 18 are provided in the side walls 14 and extend downwardly from the base of each slot 17 to the base 13 of the tray. The ribs comprise deformed double wall portions of the side wall as shown in FIG. 3. As further shown in FIG. 4, the central portion 19 of the bottom wall 13 is connected to the remainder of the bottom wall along a weakened line 20, for example, a scored line, whereby the central portion 19 may be removed as presently described.

In preparing the package, the food is applied to the skewers 12 and the skewers are placed in position in the tray 10 with the ends of the skewers engaging opposed slots 17. The package is then frozen, before or after the cover 11 is applied. In this condition, the package can be stored for an indefinite period.

When the housewife or other purchaser desires to use the package, the cover is removed and the tray 10 with the skewers 12 in position is placed in an oven to broil the product. Since the food is spaced from the base of the tray, the skewers can be easily rotated periodically as by means of a fork so that successive portions of the food product are brought into adjacent relationship to the flame.

The provision of the removable panel 19 in the base of the tray permits the tray to be used directly over an open fire as, for example, a charcoal fire. Thus, the package has the double utilitarian value of being capable of being used indoors or outdoors.

As shown in FIG. 5, instead of placing a single food product W on the skewers, a plurality of food products such as pieces of meat M can be placed on a single skewer which is placed in the package. The length of each skewer 12 and, in turn, the dimension of the package can be adjusted so that each skewer holds one portion of meat.

In the form of the invention shown in FIG. 2, the package 10' is adapted to contain unfrozen food such as wieners W' that are positioned normally freely in the package and not mounted on the skewers 12'. A flat cover 11' extends over the food.

When it is desired to cook the food, the cover 11' is removed and the skewers 12' are inserted through the food W' and the skewers are positioned in the slots 17', the distance being such that the bottoms of the food products W' are in spaced relation to the bottom 13' of the tray 10'.

In the modified form of package shown in FIG. 6, the frozen food package 10 is combined with a deep tray or body 21 which contains a combustible material such as charcoal C so that there is thereby provided an integral barbecue package. Body 21 comprises a deep tray of heat resistant material, preferably metal foil, and includes a base 22 and peripheral wall 23. A peripheral flange 24 on the upper end of the base is adapted to engage lip 19c and thereby support the package 10 therein in spaced relation to the base 22. Combustible material, such as charcoal C, is positioned in body 21. Reinforcing ribs 25 extend vertically on the body 21 to strengthen the body when it is made of metal foil. Body 21 also includes tabs 26 in wall 23 which have portions thereof connected to the side walls 23 along weakened lines 27. The tabs 26 can be pushed in to provide air for the combustible mixture. In addition, a kindling mat 28 is provided over the combustible material C to facilitate ignition of the material. The bottom of the tray 10 is formed with openings 19a that permit the flames to pass upwardly and cook the food. Removable tape 19b may be provided over openings 19a.

The integrated barbecue package shown in FIG. 5 is sold as a unit. When a person desires to use the package, he removes the upper package 10, pushes the tabs 26 inwardly and ignites the kindling mat. After the charcoal C is ignited, the tray 10 is placed over the body 21, the cover 10 and the tape 19b having been previously removed. The food on the skewers can then be cooked in the conventional manner, the food being rotated as desired manually without interference with the bottom of the tray.

Figure 7:
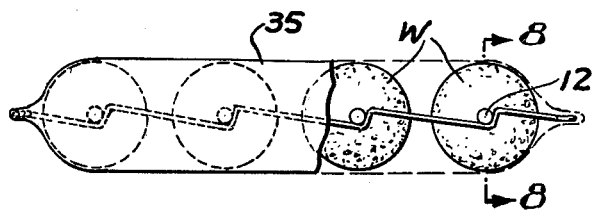
FIG. 7 is a side elevation of a further modified form of food package.
Figure 8:
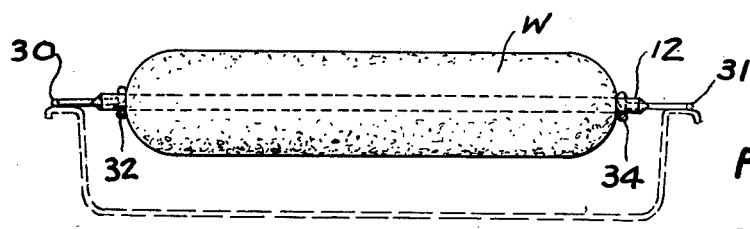
FIG. 8 is an end elevation showing a part of the food package of FIG. 7 in position for cooking the contents thereof.
Figure 9:
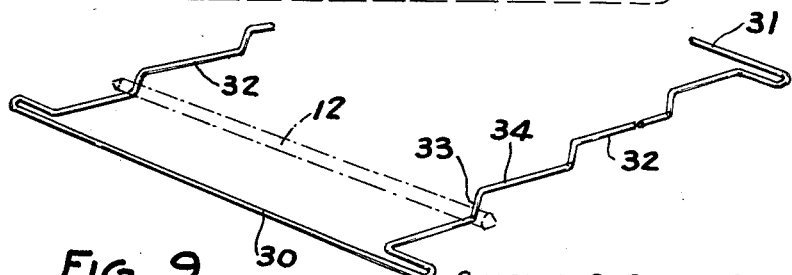
FIG. 9 is a fragmentary perspective of a portion of the food package shown in FIGS. 7 and 8.

In the modified form of package shown in FIG. 7, the meat product W on skewers 12 is positioned on a rack 30 formed of wire and the entire package of skewers, food and rack is sealed in suitable wrapper or bag 35 such as cellophane, polyvinyl chloride and the like. As shown in FIG. 9, the rack constitutes transverse end portions 30, 31 and longitudinal portions 32. Each longitudinal portion 32 includes a plurality of short generally vertical portions 33 connected to long generally horizontal portions 34 whereby at the intersection of the portions 33, 34 notches are formed for receiving the ends of the skewers as shown in FIG. 7.

When it is desired to use the package shown in FIG. 7, the wrapper is removed and the rack containing the food is applied over a conventional baking pan such as is used for baking. If the depth of the pan is such that the food product W will not contact the bottom of the tray, then the advantages of the package shown in FIGS. 1–6 are retained in that the skewers can be rotated by means of a fork or the like as the food is being cooked.

It can thus be seen that there has been provided a food package which does not require additional cooking devices; which can be used over an open flame; which incorporates its own fuel source in one form; and which, in another form, can be used over a conventional pan.

We claim:

1. A unitary frozen food package comprising a tray of metal foil having a base and opposed end walls and two opposed side walls extending upwardly from the base, each said side wall having a plurality of longitudinally spaced retaining slots for receiving the end of a skewer, a plurality of skewers, each said skewer having frozen food thereon, the ends of each skewer being received in opposed retaining slots in the opposed side walls, said retaining slots being so positioned that the food products on the skewers are in slightly spaced relation to the base of the tray, a second body of metal foil comprising a base and an upwardly extending peripheral flange, said tray being telescoped into the upper end of said second body and supported by the upper end of said peripheral flange, the base of said tray being substantially spaced from the base of said second body and combustible material positioned in said body between the base of said tray and the base of said body, the base of said tray having a detachable portion connected to the remainder of the tray along a weakened line.

2. A unitary frozen food package comprising a tray of metal foil having a base and opposed end walls and opposed side walls extending upwardly from the base, each said wall being deformed at longitudinally spaced points to define a plurality of open ended vertical slots for receiving the ends of skewers, a plurality of skewers, each said skewer having frozen food products thereon, the ends of each skewer being received in opposed retaining slots in the opposed walls, said retaining slots being so positioned that the food products on the skewers are in slightly spaced relation to the base of the tray, and a cover extending over said tray and enclosing said food products, a body of metal foil comprising a base and an upwardly extending peripheral flange, said tray being telescoped into the upper end of said second body and supported by the upper end of said peripheral flange, the base of said tray being substantially spaced from the base of said second body and combustible material positioned in said body between the base of said tray and the base of said body, the base of said tray having a detachable portion connected to the remainder of the tray along a weakened line.

3. A unitary food package comprising a tray of metal foil having a base and opposed end walls and two opposed side walls extending upwardly from the base, each said side wall having a plurality of longitudinally spaced retaining slots for receiving the end of a skewer, each said wall having portions closing the outer ends of said slots, a plurality of skewers, each said skewer having food thereon, the ends of each skewer being received in opposed retaining slots in the opposed side walls, said retaining slots being so positioned that the food products on the skewers are in slightly spaced relation to the base of the tray, a second body of metal foil comprising a base and an upwardly extending peripheral flange, said tray being telescoped into the upper end of said second body and supported by the upper end of said peripheral flange, the base of said tray being substantially spaced from the base of said second body and combustible material positioned in said body between the base of said tray and the base of said body, the base of said tray having a detachable portion connected to the remainder of the tray along a weakened line.

4. A frozen food package comprising a tray made of heat-resistant material having a base and at least two opposed walls extending upwardly from the base, each said wall having means thereon defining a plurality of retaining slots for receiving the end of a skewer, a plurality of skewers, each said skewer having frozen food thereon, the ends of each skewer being received in opposed retaining slots in the opposed walls, said retaining slots being so positioned that the food products on the skewers are in slightly spaced relation to the base of the tray, and a cover extending over said tray and enclosing said food, said tray having means associated with said base thereof for selectively forming openings for placement of said tray and its contents over an open fire for cooking the food.

5. A frozen food package comprising a tray made of heat-resistant material having a base and at least two opposed walls extending upwardly from the base, each said wall having means thereon defining a plurality of retaining slots for receiving the end of a skewer, a plurality of skewers, each said skewer having frozen food thereon, the ends of each skewer being received in opposed retaining slots in the opposed walls, said retaining slots being so positioned that the food products on the skewers are in slightly spaced relation to the base of the tray, and a cover extending over said tray and enclosing said food, said means defining a plurality of retaining slots comprising deformations in the wall of said tray, said wall having portions closing the ends of said slots.

6. A frozen food package comprising a tray made of heat-resistant material having a base and at least two opposed walls extending upwardly from the base, each said wall having means thereon defining a plurality of retaining slots for receiving the end of a skewer, a plurality of skewers, each said skewer having frozen food thereon, the ends of each skewer being received in opposed retaining slots in the opposed walls, said retaining slots being so positioned that the food products on the skewers are in slightly spaced relation to the base of the tray, and a cover extending over said tray and enclosing said food, said means defining a plurality of retaining slots comprising a removable wire rack positioned on said tray, said rack having a plurality of longitudinally spaced notches on the sides thereof defining said retaining slots.

7. A food package comprising a tray of heat-resistant material having a base and at least two opposed walls extending upwardly from the base, each said wall having a plurality of longitudinally spaced retaining slots formed integrally for receiving the ends of skewers, each said wall having portions closing the outer ends of said slots, each said slot being positioned adjacent the upper edge of its respective wall and having its upper end open, a plurality of skewers, each said skewer having food thereon, the ends of each skewer being received in opposed retaining slots in the opposed walls, said retaining slots being so positioned that the food products on the skewers are in slightly spaced relation to the base of the tray, and a cover extending over said tray and enclosing said food, said tray including slots in the base thereof, and means removably closing said slots.

8. A frozen food package comprising a tray of metal foil having a base and opposed end walls and opposed side walls extending upwardly from the base, each said side wall being deformed at a plurality of longitudinally spaced points to define retaining slots for receiving the ends of skewers, each said wall having portions closing the outer ends of said slots, a plurality of skewers, each said skewer having frozen food thereon, the ends of each skewer being received in opposed retaining slots in the opposed side walls, said retaining slots being so positioned that the food products on the skewers are in slightly spaced relation to the base of the tray, and a cover extending over said tray and enclosing said tray and enclosing said food, the base of said tray having the major portion thereof detachably connected from the tray along a weakened line so that the detachable portion can be removed for placement of the tray over an open flame for cooking the food on the skewers.

9. The combination set forth in claim 1 including integral reinforcing ribs extending generally vertically from the base of said retaining slots to the base of the tray.

References Cited in the file of this patent

UNITED STATES PATENTS

| | | |
|---|---|---|
| 472,595 | Wachs | Apr. 21, 1892 |
| 1,391,268 | O'Brien | Sept. 20, 1921 |
| 1,391,269 | O'Brien | Sept. 20, 1921 |
| 2,046,352 | Warner | July 7, 1936 |
| 2,605,187 | Stiehm | July 29, 1952 |
| 2,990,096 | Crosby | June 27, 1961 |